US011403339B2

(12) United States Patent
Maheshwari et al.

(10) Patent No.: US 11,403,339 B2
(45) Date of Patent: Aug. 2, 2022

(54) TECHNIQUES FOR IDENTIFYING COLOR PROFILES FOR TEXTUAL QUERIES

(71) Applicant: Adobe Inc., San Jose, CA (US)

(72) Inventors: Paridhi Maheshwari, Madhya Pradesh (IN); Vishwa Vinay, Bangalore (IN); Manoj Ghuhan Arivazhagan, Tamil Nadu (IN)

(73) Assignee: Adobe Inc., San Jose, CA (US)

(*) Notice: Subject to any disclaimer, the term of this patent is extended or adjusted under 35 U.S.C. 154(b) by 241 days.

(21) Appl. No.: 16/865,888

(22) Filed: May 4, 2020

(65) Prior Publication Data
US 2021/0342389 A1 Nov. 4, 2021

(51) Int. Cl.
G06F 16/583 (2019.01)
G06F 16/532 (2019.01)
G06N 20/00 (2019.01)
G06F 16/54 (2019.01)
G06F 16/58 (2019.01)

(52) U.S. Cl.
CPC ........ G06F 16/5838 (2019.01); G06F 16/532 (2019.01); G06F 16/54 (2019.01); G06F 16/5866 (2019.01); G06N 20/00 (2019.01)

(58) Field of Classification Search
None
See application file for complete search history.

(56) References Cited

U.S. PATENT DOCUMENTS

| 8,406,573 B2 * | 3/2013 | Wang | G06V 20/00 |
| | | | 382/162 |
| 10,459,971 B2 * | 10/2019 | Fu | G06K 9/6215 |
| 2002/0081024 A1 * | 6/2002 | Park | G06F 16/5838 |
| | | | 382/165 |
| 2010/0125568 A1 * | 5/2010 | van Zwol | G06V 10/40 |
| | | | 707/E17.017 |
| 2014/0204109 A1 * | 7/2014 | Bose | G06V 10/56 |
| | | | 345/589 |
| 2014/0270498 A1 * | 9/2014 | Chester | G06V 10/50 |
| | | | 382/162 |

(Continued)

FOREIGN PATENT DOCUMENTS

| EP | 2368200 B1 * | 7/2018 | ......... G06F 17/3025 |
| JP | 4108961 B2 * | 6/2008 | ............. G06F 16/58 |

OTHER PUBLICATIONS

Pirvu, M.—"Predicting user intent from search queries using both CNNs and RNNs"—arXiv2018, pp. 1-14 (Year: 2018).*

Adobe Color: https://color.adobe.com/explore; 1 page; retrieved from the Internet Aug. 25, 2020., 2020.

(Continued)

Primary Examiner — Bernard Krasnic
(74) Attorney, Agent, or Firm — Keller Preece PLLC

(57) ABSTRACT

The disclosed techniques include at least one computer-implemented method performed by a system. The system can receive a textual query and process query features of the textual query to identify a color profile indicative of a color intent of the query. The system can identify candidate images that at least partially match the desired content and color intent of the query. The system can further order candidate images based in part on a similarity of a candidate color profile for each candidate image with the identified color profile of the query, and output image data indicative of the ordered set of candidate images.

20 Claims, 8 Drawing Sheets
(5 of 8 Drawing Sheet(s) Filed in Color)

(56) References Cited

U.S. PATENT DOCUMENTS

| | | | | |
|---|---|---|---|---|
| 2015/0324366 A1* | 11/2015 | Becker | ............... | G06F 16/313 707/706 |
| 2019/0325088 A1* | 10/2019 | Dubey | ............... | G06T 7/11 |

OTHER PUBLICATIONS

Colourlovers: https://www.colourlovers.com/colors; 1 page; retrieved from the Internet Aug. 25, 2020;, 2020.

https://adobe.brightidea.com; retrieved from the Internet Aug. 25, 2020, 2 pages., 2020.

Pantone Color Institute: https://www.pantone.com/color-consulting/about-pantone-color-institute; 1 page; retrieved from the Internet Aug. 25, 2020., 2020.

Picular: https://picular.co/; website image retrieved, 1 page, Aug. 25, 2020., 2020.

Burges, Christopher, et al., "Learning to rank using gradient descent." Proceedings of the 22nd International Conference on Machine learning (ICML), 8 pages, 2005., 2005.

Havasi, Catherine, et al., "Automated color selection using semantic knowledge." 2010 AAAI Fall Symposium Series, 6 pages, 2010., 2010.

Heer, Jeffrey, et al., Color naming models for color selection, image editing and palette design. Proceedings of the SIGCHI Conference on Human Factors in Computing Systems. ACM, 10 pages, 2012., 2012.

Lee, Joon-Young, et al., "Automatic content-aware color and tone stylization." Proceedings of the IEEE Conference on Computer Vision and Pattern Recognition, 9 pages, 2016., 2016.

Lindner, Albrecht, et al., "What is the color of chocolate?—Extracting color values of semantic expressions." Conference on Colour in Graphics, Imaging, and Vision. Society for Imaging Science and Technology, 7 pages, 2012., 2012.

Monroe, Will, et al., Colors in context: A pragmatic neural model for grounded language understanding. Transactions of the Association for Computational Linguistics, 14 pages, 2017., 2017.

O'Donovan, Peter, et al., "Color compatibility from large datasets." ACM Transactions on Graphics, 8 pages, 2011., 2011.

\* cited by examiner

TECHNIQUES FOR IDENTIFYING COLOR PROFILES FOR TEXTUAL QUERIES

TECHNICAL FIELD

The disclosed teachings generally relate to information retrieval. The disclosed teachings more particularly relate to identifying a color intent of a textual query and retrieving candidate images that match the color intent of the textual query to provide results that more accurately reflect desired image content.

BACKGROUND

Color plays a major role in the visual perception that humans experience. As such, the perception of color is fundamental in graphics, images, and web design because color is critical in order to evoke a desired reaction from a human observer. Accordingly, companies invest in technology to improve search engines for images with desired color characteristics. A search engine can search to find stock images in a database that are associated with words that match text in a search query. That is, a search engine will receive a query including text used to search for images that have metadata with the same text. However, search engines typically limit a relevance score to sematic similarities between textual input and metadata associated with the images. Moreover, search engines fail to consider characteristics of a particular image such as color distribution, quality, and objects of the image to determine whether the image is relevant to a search query.

Adobe Stock® is an example of a product that provides consumers with access to millions of stock photos, videos, illustrations, vector graphics, 3D assets, and templates for creative projects. A search engine for Adobe Stock can retrieve relevant images for a given query. Some search techniques include tools that extract colors of every stock image for a given search query or use stock images with user-defined color characteristics that enable keyword searches. Search tools include color palettes that allow users to search for selected colors in images or explore themes by using color terms to constrain queries. Services include manual consulting to aid consumers in making informed decisions about colors for brands or products. As such, consumers can receive assistance in choosing a color palette for brands, website designs, etc. Therefore, the ability to find images with relevant colors is critical but existing tools are burdensome and unreliable.

BRIEF DESCRIPTION OF THE DRAWINGS

This disclosure contains at least one drawing executed in color. Copies of the corresponding publication with color drawings will be provided by the Patent Office upon request and payment of the necessary fee.

Figure 1:
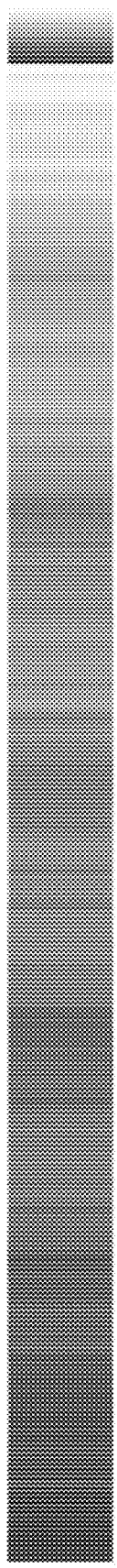
FIG. 1 depicts a color representation as a distribution over numerous color bins in a red-green-blue color space.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Introduced herein is at least one technique for identifying a color representation of a search query. The term "color representation" refers to a "color profile" for a textual query. The color profile is identified based on an explicit or implicit indication of color in a query. That is, the color profile reflects a color intent of the query. In one example, a search engine can consider the color profile of a query to identify images with relevant color characteristics. For example, the search engine can be trained with color profiles of numerous queries in accordance with machine learning techniques by associating the color profiles with click-through behavior of users. In particular, query logs of a search engine include query text strings that were input by users, corresponding search results, and historical click-through behavior of the user navigating through the search results to identify a selected image that indicates a color intent.

The click-through behavior can include any user interaction features with a set of candidate images returned as results for a textual query. Examples of different types of user interaction features include selections and/or non-selections of candidate images, a sequence of selections of candidate images, a relative amount of time spent displaying a subset of candidate images while the user scrolls through the candidate images, a relative amount of time spent hovering a pointer over a candidate image, or any other user action to interact with a candidate image.

The different types of user interaction features can have weightings of different magnitudes. As such, the machine learning model can be differentially biased based on the different types of interaction features. For example, selections of candidate images could have a weighting with a magnitude that is greater than a weighting for navigating through a sequence of the selections of the candidate images, which could be greater than a weighting for scrolling through the candidate images. As such, the selections of candidate images biases the model more than the sequence of the selections, which biases the model more than scrolling through the candidate images. Therefore, different types of user interaction features can have a different impact on how the machine learning model is trained.

The trained search engine can process a new query to improve corresponding search results that are more relevant with respect to the color intent of the query. That is, by identifying the color profile of the query, the search engine can retrieve highly relevant images that satisfy the color intent of the query and thereby improve performance of the search engine. This technique can utilize a distance factor between a current prediction of a color profile of a query and desired color profiles of candidate images, to rank search results based on their respective similarities to ultimately improve performance of a search engine.

The performance of a search engine relies on the ability to rank relevant content over other content for a given query. In the disclosed embodiments, the relevance of images is not limited to semantic similarity between the query and the images but also considers characteristics of a particular image such as color distribution, quality, and objects in the image. For example, consider the query with the search term "apple." A priori, it is unclear if an image containing a green apple is more or less relevant than an image that contains a red apple. Historical click-through behavior by users through images of search results can indicate which images are preferred by users. For example, the selected candidate images indicate a color intent of a query. However, without additional metadata associated with the images, it would be challenging to establish which category of images (e.g., red or green apples) are preferred in response to a query (e.g., apple). Accordingly, an improved search engine considers a color intent to find relevant images. The term "color intent," as used herein, refers to the existence of a preference of a color profile over others.

This disclosure addresses the importance of searching for relevant rich media assets (e.g., images) based on the color intent of queries. In particular, search engines can provide indexing and querying services across products, which requires rich feature representations for both queries as well as content (e.g., images). While the importance of color is straight-forward for images, there exists both implicit and explicit color associations in queries that are unexploited for improving searches. The disclosed technology can identify or determine color profiles for search queries and their impact on ranking image results. The technology can map queries to color models, which not only enables back-end search improvements (e.g., via a color-match ranking feature) but also enables user experience improvements (e.g., selectively displaying a subset of colors for filtering).

A search query commonly includes search terms that a user inputs into a search engine to return results that satisfy the search terms. In particular, search queries are often textual with optional search-directives (e.g., "and"/"or" with "-" to exclude). Search queries vary greatly among query languages, and are normally governed by strict syntax rules as command languages with keyword or positional parameters. For example, a user can initiate a search by inputting a textual query into a search engine that will find information relevant to the text of the query. The search results exist in a database to discover, understand, and organize content (e.g., images) in order to offer the most relevant results to satisfy queries.

In general, about 5% of the queries that are input to search engines include explicit textual indications of color (e.g., "black car" or "blue sky"). Another portion of the queries have an implicit indication of color (e.g., "coffee" and "forest"). The explicit or implicit indication of color in a query is represents a color intent, which, if understood by a search engine, can produce a color profile that is used to retrieve highly relevant images that satisfy the query and thereby improve performance of the search engine.

There have been several efforts in to bridge the gap between textual query inputs (e.g., language) and colors of search results. In some instances, techniques employ a probabilistic model to encode relationships in a color naming datasets. Other solutions use neural network architectures to predict points in a color space given the names of colors. In other instances, a color is identified by interpolating between known words in a query and metadata associated with images. Other techniques involve utilizing statistical frameworks on images fetched from search engines. Yet another technique establishes human color preferences and also defines compatibility between colors. For example, a tool can generate diverse stylizations for images by transferring the global tone and color of an exemplar into an input photo. A color similarity search tool can be incorporated in a "find similar" feature of a stock image search engine to determine a distance between two images to rank the images based on color.

The aforementioned tools are lacking on several fronts. First, they require skewed vocabularies of explicit color descriptors (e.g., bluish green, light pink) rather than relying on commonplace objects in the image that signal a strong color intent. Second, these tools assign a single best color to an image and do not allow for multiple valid color options. Additionally, these techniques do not learn from existing data and rely on, for example, a standard image search or hand-curated datasets to learn a mapping between textual queries and relevant images. The disclosed embodiments address all these limitations by leveraging machine learning to learn a mapping between arbitrary word sequences queries to a distribution in a color space for images.

Understanding a color intent represented as a color profile of a query aids the search engine to improve retrieval performance and will also help in enhancing other features of a search engine. For example, some search engines allow users to filter images by using an RGB color palette. For a given query, a user can select a color from the palette and the images are filtered in accordance with the added constraint for color. However, selecting the correct set of colors from the RGB palette for a query can be tedious and confusing, which leads to sparse usage (about <1% of queries) of color filters to constrain a search for relevant results that reflect a color intent. For example, a solution includes websites that use customized color palettes that consist of colors that are relevant to items or queries. The relevant colors are generally hand-curated and, as such, this solution is not scalable. Thus, having an indication of color intent of a query helps using a search query to find relevant colors and would be useful for automating a color filtering process.

Accordingly, the disclosed techniques include a method for determining a color profile of a query by, for example, leveraging historical click through data generated by users that clock through stock images that are returned as search results of queries. The disclosure includes empirical evidence that demonstrates that the use of a distance measure between the color representation of a query and a color representation of an image as a ranking feature results in an improved performance of the search engine.

The disclosed technique can leverage large-scale user behavioral data to identify images that users have clicked-on versus images that were not clicked-on by the users (i.e., clicked versus not-clicked), when shown as results in response to their search queries. The click-through data represents aggregate preferences of search engine users, which is leveraged to allow for a data-driven process to understand a color representation of a query or an image. In contrast, a color palette, which is central to a design process, merely provides a discrete representation of color. That is, there is a limit on the number of RGB values (e.g., 5) and their relative contribution to the final combination is lost. In contrast, the disclosed techniques consider continuous representations of how a color is obtained by combining fractional amounts of unitary RGB values.

While it may be intuitive that color is an important component of an image search, this disclosure includes the only known technique that leverages any relationship between color and a search result ranking. The technique can also jointly optimize a color prediction framework for ranking while remaining mindful that an end goal of ranking relevant content higher than less relevant content.

In contrast to tools that examine color across images, the disclosed techniques associate language, particularly search queries, with color and leverage the language to improve the user experience of a stock image search engine. The disclosed techniques offer differentiating features over existing tools. Firstly, search queries are represented as profiles in a color space by using a query log of a stock image search engine. Secondly, a machine learning model is trained to learn a mapping from natural language to color and thereby enable prediction of a relevant images for given queries. Thirdly, a custom loss function is used for training to measure distances between images in a color space. Fourthly, user click-through behavior is used to identify suitable color profiles by using the candidate images of search results for queries. Fifthly, any conventional image search engine can embed disclosed features to improve image retrieval performance. Sixthly, a ranker feature has an intermediate layer regularization that can learn a color profile and user interaction features (e.g., clicked-verses-not) prediction simultaneously.

Training Dataset

The disclosed technique can use the query log of an existing search engine, which contains information about queries, image set results, the ranked order list of the results, and the images that were clicked-on by users. In some instances, some or all images of available to a search engine contains the following metadata: a caption provided by each image creator, one or more tags describing content of each image, and a color profile as a probability distribution over 327 predefined points in the RGB color space, as shown in, for example, FIG. 1.

Learning Color Representations of Queries

The disclosed embodiment leverages the query log to create color representation (e.g., color profiles) for queries. A neural network model is deployed to generalize color profiles of queries to train a model used to find relevant image search results for queries. A color profile for a query is defined as the average of the color histograms of the clicked images of a results set of a query. To put it mathematically, a query q with displayed images $I_q = \{I_q^1, I_q^2, \ldots I_q^N\}$ and clicked-or-not Boolean variable $r_q$ $\{r_q^1, r_q^2, \ldots r_q^N\}$ is embedded in the color space as, $$C_q = \sum_{i=1}^{N} r_q^i * C_i$$

where $C_i$ is the histogram corresponding to image $I_q^i$.

Figure 2:
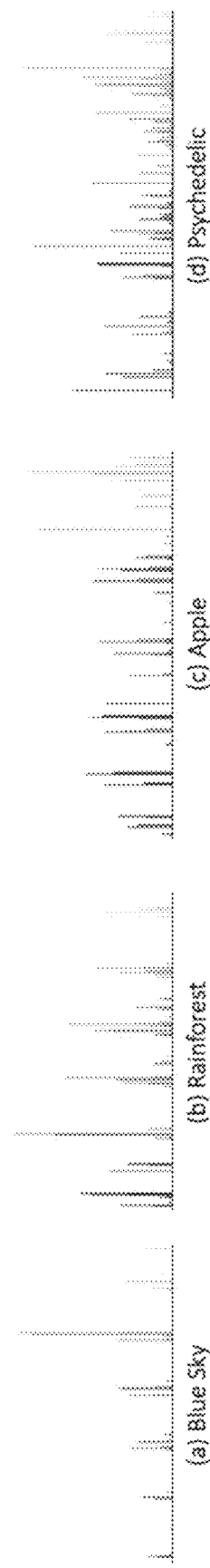
FIG. 2 illustrates examples of color profiles for queries with different color intents.

FIG. 2 illustrates examples of color profiles for queries with different color intents. The examples include a mapping for each of the following textual inputs: (a) "Blue Sky"; (b) "Rainforest"; (c) "Apple"; and (d) "Psychedelic." In particular, a query for "Blue Sky" has an explicit mention of color, a query for "Rainforest" has an implicit color intent, a query for "Apple" has an implicit bi-modal color intent, and a query for "Psychedelic" has a uniform color intent.

Figure 3:
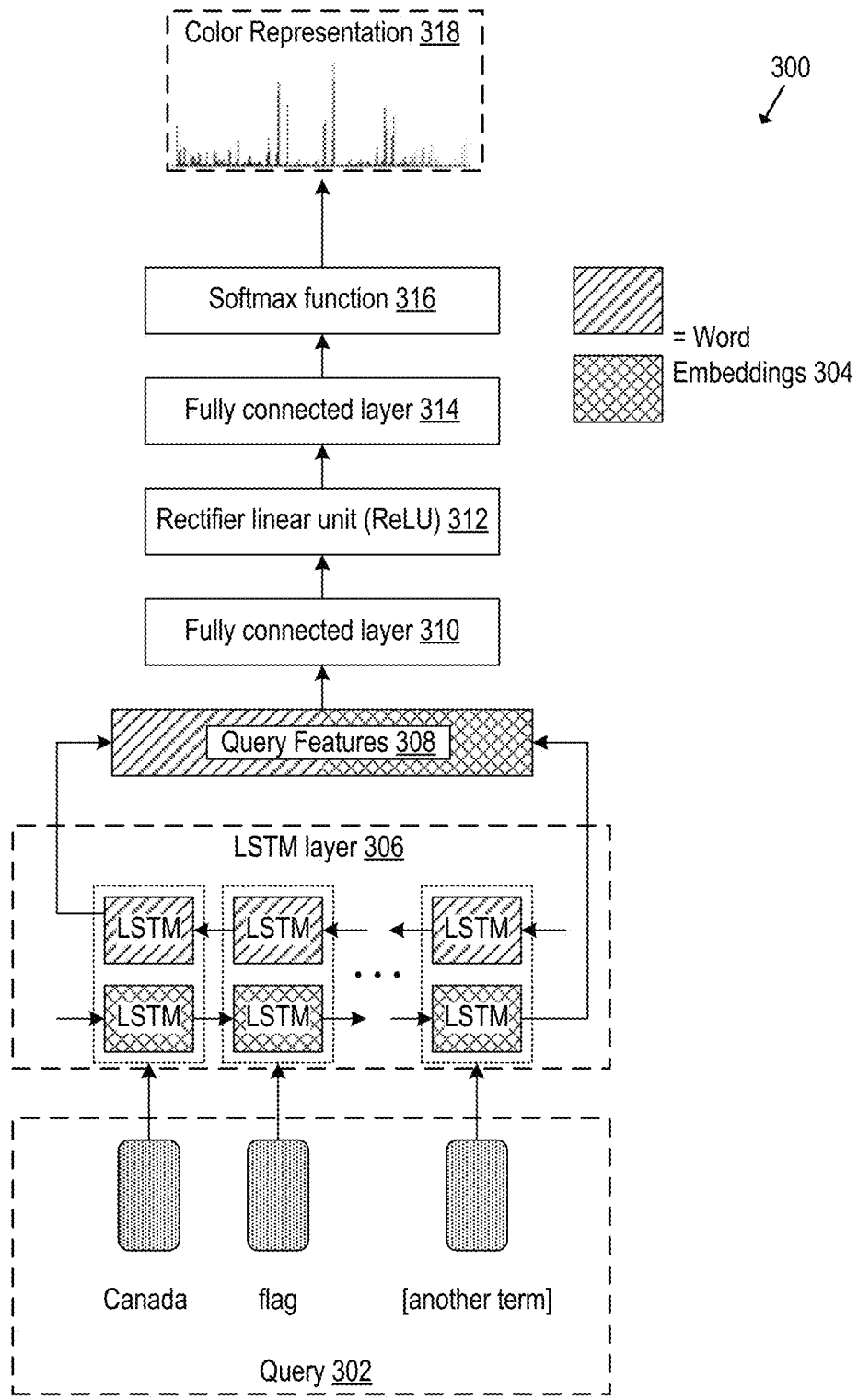
FIG. 3 is a block diagram that illustrates an architecture of a query color encoder.

FIG. 3 is a block diagram that illustrates an architecture of a query color encoder 300. The query color encoder 300 outputs a color profile of a query (e.g., a profile in a color space). Learning the color profiles of queried terms enables a search engine to process other queries that can be mapped to a query log in a color space. To predict a color profile for a new query, the query encoder 300 trains a neural network to accept a new query as input and output a predicted color profile that represents the query.

In the illustrated example, the query 302 has text including terms such as "Canada" and "flag." To capture the context of the query 302, word embeddings 304 are used to represent the text of the query 302. A term "word embedding" refers to the collective name for a set of language modeling and feature learning techniques in natural language processing (NLP) where words or phrases from a vocabulary are mapped to vectors of real numbers. Conceptually, word embedding involves a mathematical embedding from a space with many dimensions per word to a continuous vector space with a much lower dimension.

A sequence of word embeddings 304 are passed through a bidirectional long short-term memory (LSTM) layer 306 of a neural network, which is used for the learning. The output of the LSTM layer 306 is a combination (e.g., a concatenation) of word embeddings that results in query features 308, which are passed through a fully connected network including a fully connected layer 310, a rectifier linear unit (ReLU) 312, and another fully connected layer 314. The output of the fully connected layer 314 is then passed through a softmax function 316, which returns a color representation 318 as a probability distribution over color bins. A softmax function (also referred to as a normalized exponential function), is a function that takes as input a vector of K real numbers, and normalizes the vector into a probability distribution consisting of K probabilities proportional to the exponentials of the input numbers.

A machine learning model can utilize an objective function to guide training. In a current context, the objective function computes the distance between the model's current prediction of a color profile, at an intermediate point of the training, and the desired ground-truth. The disclosed technique can consider a choice of possible objective functions. For example, an objective function can be motivated by known behavior of user perception that is expected to guide the training of the model towards producing output that respects the available ground-truth as much as possible, and predicts something similar in color, generally.

For example, to guide training of a model towards a desired color representation, a CIELUV color space can be leveraged as an objective function. CIELUV is a color space adopted by the International Commission on Illumination (CIE) in 1976, as a simple-to-compute transformation of the 1931 CIE XYZ color space, but which attempted perceptual uniformity. This space comprises of 3 channels: L for luminance and U and V together forming the chrominance channels, and distances in this space capture human perception more accurately. A color histogram is represented using statistics from the chrominance and luminance channels separately and define the distance as, $$D_{LUV}(P\|Q) D_e(L_P, L_Q)^2 \cdot D_h(N_P, N_Q)^1$$

where $D_e$ represents the Euclidean distance between the luminance features $L_P$, $L_Q$ and $D_h$ is the Hellinger distance between the summary statistics $N_P$, $N_Q$ for the 2D Gaussian chrominance channels of the two histograms P and Q.

Table 1 shows a comparison of model losses across training, validation, and a test set. Table 1 indicates that the learning process of the query encoder 300 is well behaved by handling over-fitting and addressing similar concerns.

TABLE 1

Model Losses

| | |
|---|---|
| Training Loss | 0.015 |
| Validation Loss | 0.016 |
| Test Loss | 0.016 |
| XKCD Loss | 8.055 |

Figure 4:
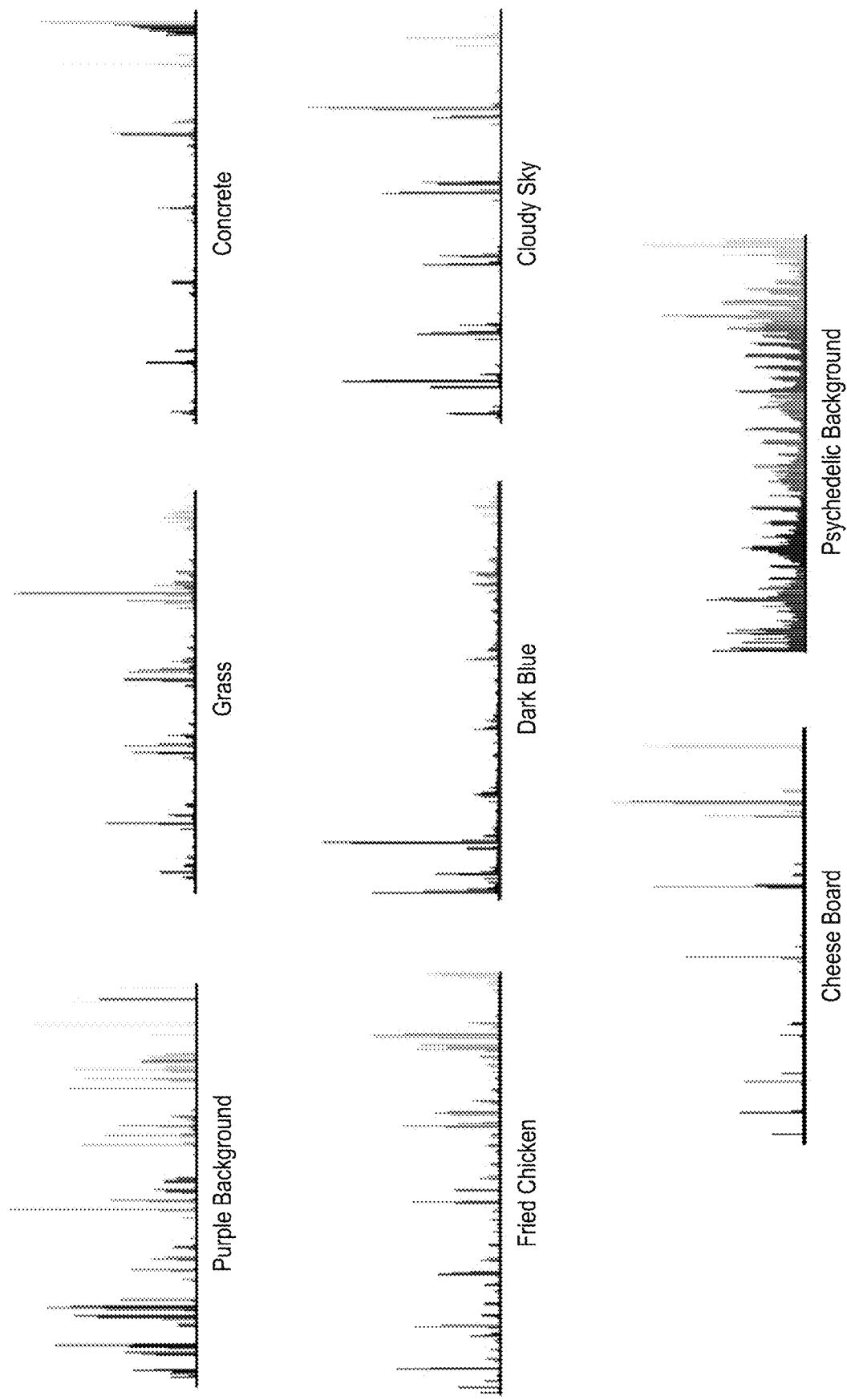
FIG. 4 shows examples of queries and resulting color profiles learned by a query color encoder.

FIG. 4 shows examples of queries and resulting color profiles produced by a query color encoder 300. In the illustrated examples, the textual queries include "Purple Background," "Grass," "Concrete," "Fried Chicken," "Dark Blue," "Cloudy Sky," "Cheese Board," and "Psychedelic Background." Each of these textual queries is represented as a probability distribution over color bins (e.g., a color profile), which indicates a color intent of the query. Thus, the query color encoder 300 can provide model predictions for queries as qualitative evidence of the performance. The query color encoder can learn subtle differences in color representations that arise because of color combinations (e.g., "Pink Red" and "Orange Red") or intensifiers (e.g., "Deep" and "Dark") or commonsense knowledge (e.g., "Blood Red").

To demonstrate the generalizability of the query color encoder model, the query color encoder 300 is tested on a standard XKCD dataset, which is a large crowd-sourced color-naming survey. In particular, the XKXD contains mappings for about 2.3 million color names to points in the RGB space. Since the XKXD dataset provides a mapping to a single RGB value, the negative log-likelihood of the histogram can be computed to measure quality. The following equation is an XKXD loss function (between P and Q):

$$XKCD\ Loss(P\|Q) = -\sum_i \mathbb{1}_{(P_i \neq 0)} * \log Q_i$$

Figure 5:
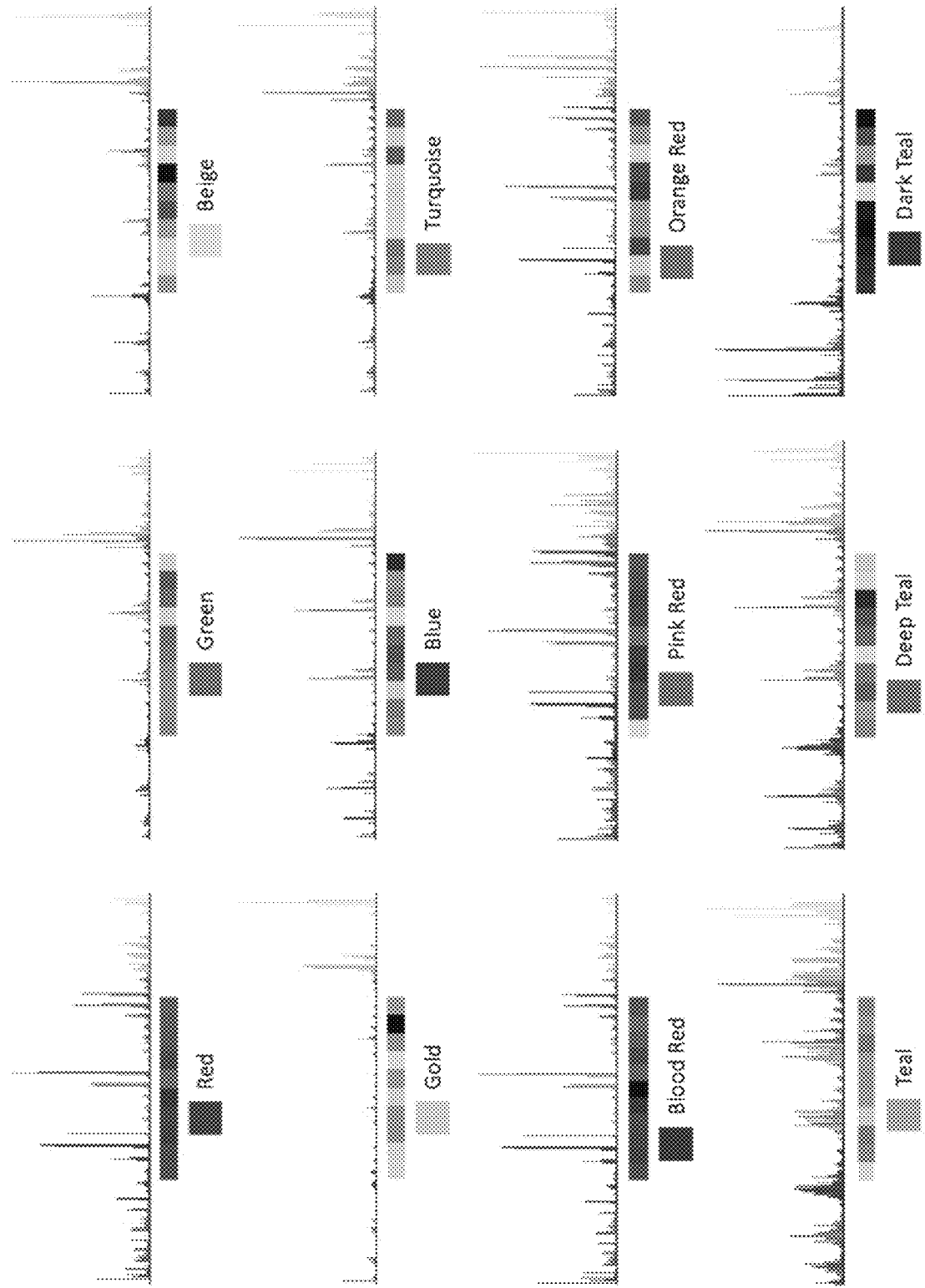
FIG. 5 shows example subplots of queries processed by the query color encoder in an XKCD dataset.

The ideal scenario, when the model of the query color encoder predicts the correct RGB bin with probability 1, yields an XKCD loss of 0. In all other cases, the metric strongly discourages placement of any probability mass in other bins. The query color encoder performs well even on non-search queries and does not overfit to a given dataset. For example, FIG. 5 shows example subplots of queries processed by the query color encoder in an XKCD dataset. In particular, each subplot includes a color name, an RGB point in the XKCD dataset, a predicted color histogram (e.g., color profile), and top 10 bins.

In one embodiment, the model is trained based on a particular demographic of users. For example, the model can be trained based on a query log for a group of users in a particular country or region, of a particular age range, or based on the sources of the queries. In another embodiment, the model is trained for a particular user. That is, the model is personalized for a user such that search results are biased based on the user's own interaction features with sets of candidate images.

Ranker Architecture with Intermediate Layer Regularization

Figure 6:
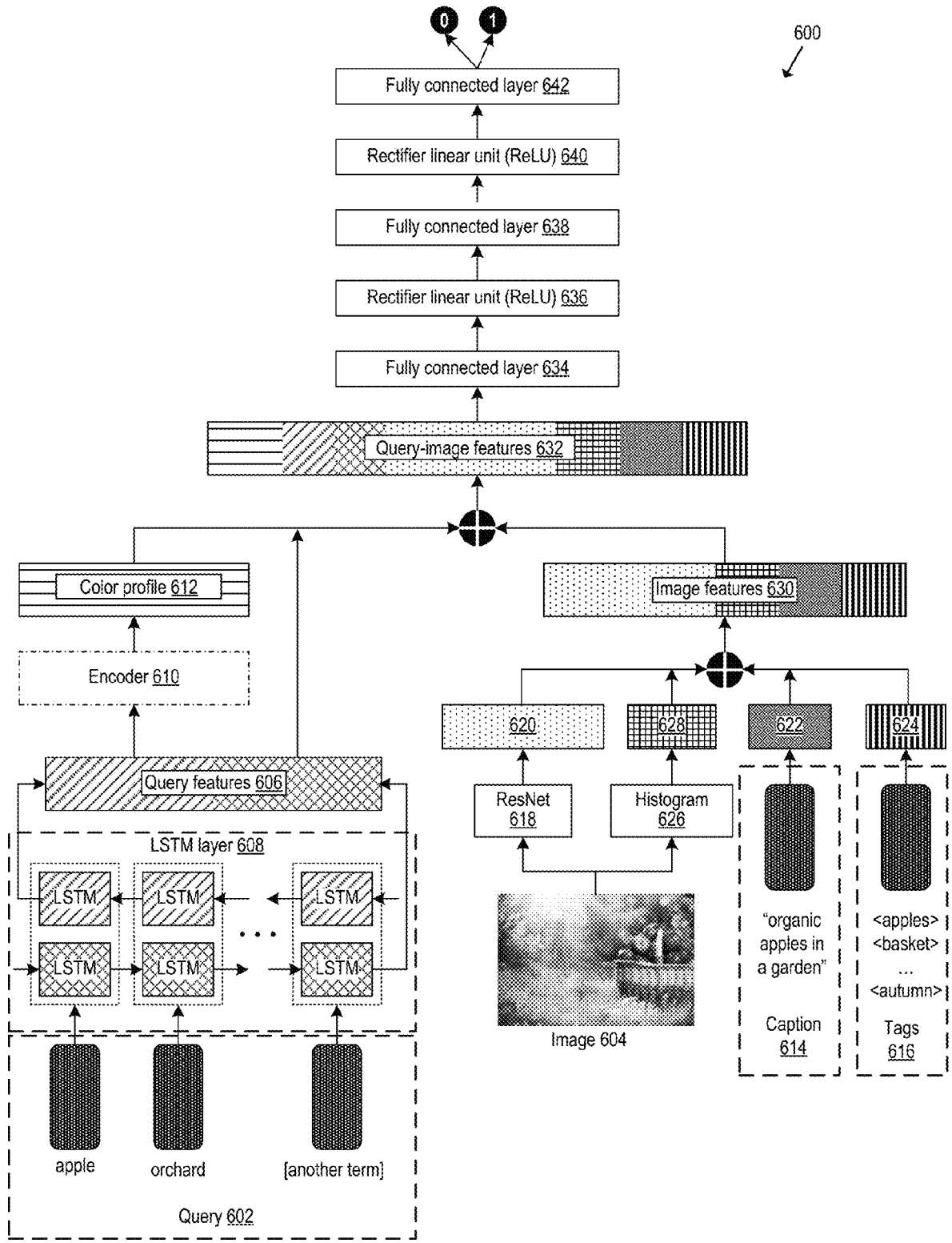
FIG. 6 is a block diagram that illustrates an architecture of a ranker to rank images relative to the color intent of a query.

FIG. 6 is a block diagram that illustrates an architecture 600 of a ranker with intermediate layer regularization, to rank images relative to the color intent of a query. The architecture 600 receives a (query, image) pair as input and processes the pair to output a score that indicates the relevance of the image in the context of the query relative to color intent. The regularized architecture 600 consistently outperforms a baseline model, where the regularization is due to using a color profile in upstream machine learning layers and also by comparing the color profile to a ground-truth color profile for a query. The architecture 600 improves a ranking quality of an image retrieval process with a cross-modal network that is trained to learn ranking of images for a given textual query. In the illustrated example, the network is trained using a Boolean click versus not-clicked label available from query logs of a search engine as described earlier.

The architecture 600 receives a query 602 and a color image 604. Specifically, a query processing component receives as input the query 602, which contains text including the terms "apple" and "orchard." The textual input of the query 602 is processed in accordance with the color query encoder such as that described with respect to FIG. 3. That is, query features 606 are obtained from word embeddings passed through an LSTM layer 608 followed by an encoder 610 to output a color profile 612 of the query 602.

An image processing component receives as input the image 604, a caption 614, and tags 616. In the illustrated example, the image 604 presents a garden that includes a basket with red apples. The caption 614 associated with the image 604 includes the set of words "organic apples in a garden." The tags 616 associated with the image 604 includes the set of tags "<apples>," "<basket>," and "<autumn>." The image 604 is processed through a residual network (ResNet) 618. A ResNet is a type of specialized neural network for machine learning tasks.

The ResNet 618 includes a model that is trained on stock images of a search engine to provide image embeddings 620 of the image 604. Moreover, word embeddings 622 and 624 are obtained based on the set of words in the caption 614 and the tags 616, respectively. The image 604 is also processed to generate a histogram 626 used to produce image embeddings 628. Therefore, the architecture 600 includes the image embeddings 620 as output of the ResNet 618, the image embeddings 628 as output of the histogram 626, the word embedding 622 as output of the caption 614, and the word embeddings 624 as output of the tags 616. The image embeddings 620 and 628 and word embeddings 622 and 624 are concatenated to produce image features 630, which can be a final feature representation (e.g., profile) of the image 604.

The color profile 612, the query features 606, and the image features 630 are concatenated and used as input into a model that produces query-image features 632. The query-image features 632 are trained on the RankNet objective:

$$\mathcal{L}_R = -\frac{1}{m^2}\sum_{j=1}^{m}\sum_{\substack{k=1 \\ k \neq j}}^{m} \left(y_{jk} * \log \widehat{y_{jk}} + (1 - y_{jk}) * \log(1 - \widehat{y_{jk}})\right)$$

where $\widehat{y_{jk}} = p(s_i^j > s_i^k) = \sigma(s_i^j - s_i^k)$ indicates the probability of result j being ranked higher than result k. The variables $y_{jk}$ are obtained from the original click data by setting $y_{jk}=1$ if the result j was clicked and k was not, and $\sigma(x)$ is the sigmoid function. $s_i$ and $s_j$ are the output scores of the model, and the model parameters are learnt by optimizing for $\mathcal{L}_R$.

In particular, the query-image features 632 are processed through a series of encoding layers including a fully connected layer 634, an ReLU 636, another fully connected layer 638, an ReLU 640, followed by another fully connected layer 642, to output a binary value for the ranking.

To evaluate color as a ranking feature, the architecture 600 is extended to optimize for a clicked-versus-not classifier and query color encoder simultaneously. This is achieved by regularizing an intermediate layer of the query processing to represent the color information of the query. For example, the image histogram 626 is added to the image features 630. Additionally, to exploit the synergy between the two tasks, parameter sharing can be allowed between the components in the query color encoder.

The final training objective, therefore, comprises two different components: (1) RankNet loss and (2) query-color encoding loss. This can be expressed mathematically as:

$$\mathcal{L}_R + \frac{1}{1+\alpha} D_{LUV}$$

where $\alpha>0$ is the regularization hyper-parameter that is tuned using the validation set.

The performance of the architecture 600 can be measured using standard metrics: area under the curve (AUC), mean average precision (MAP), and mean reciprocal rank (MRR). These can be computed over the clicked images of a test set. Example results are shown in Table 2, which also contains the evaluation metrics for a query to color process.

TABLE 2

Jointly learning ranker and color representation: evaluation on (1) clicked-vs-not task and (2) color encoder

| | Ranking Metrics | | | Query → Color Metrics | |
|---|---|---|---|---|---|
| | AUC | MAP | MRR | Test Loss | XKCD Loss |
| Baseline | 0.662 | 0.264 | 0.406 | — | — |
| Baseline + Regularization | 0.673 | 0.268 | 0.418 | 0.064 | 5.793 |

As shown, the regularized architecture 600 with regularization consistently outperforms a baseline model architecture, wherein the regularization is due to using the output color profile 612 not only by the illustrated upstream layers but also by comparing the color profile 612 to a ground-truth color profile for that query. This validates that color is a consequential feature that guides ranking, and hence, human discernment.

Figure 7:
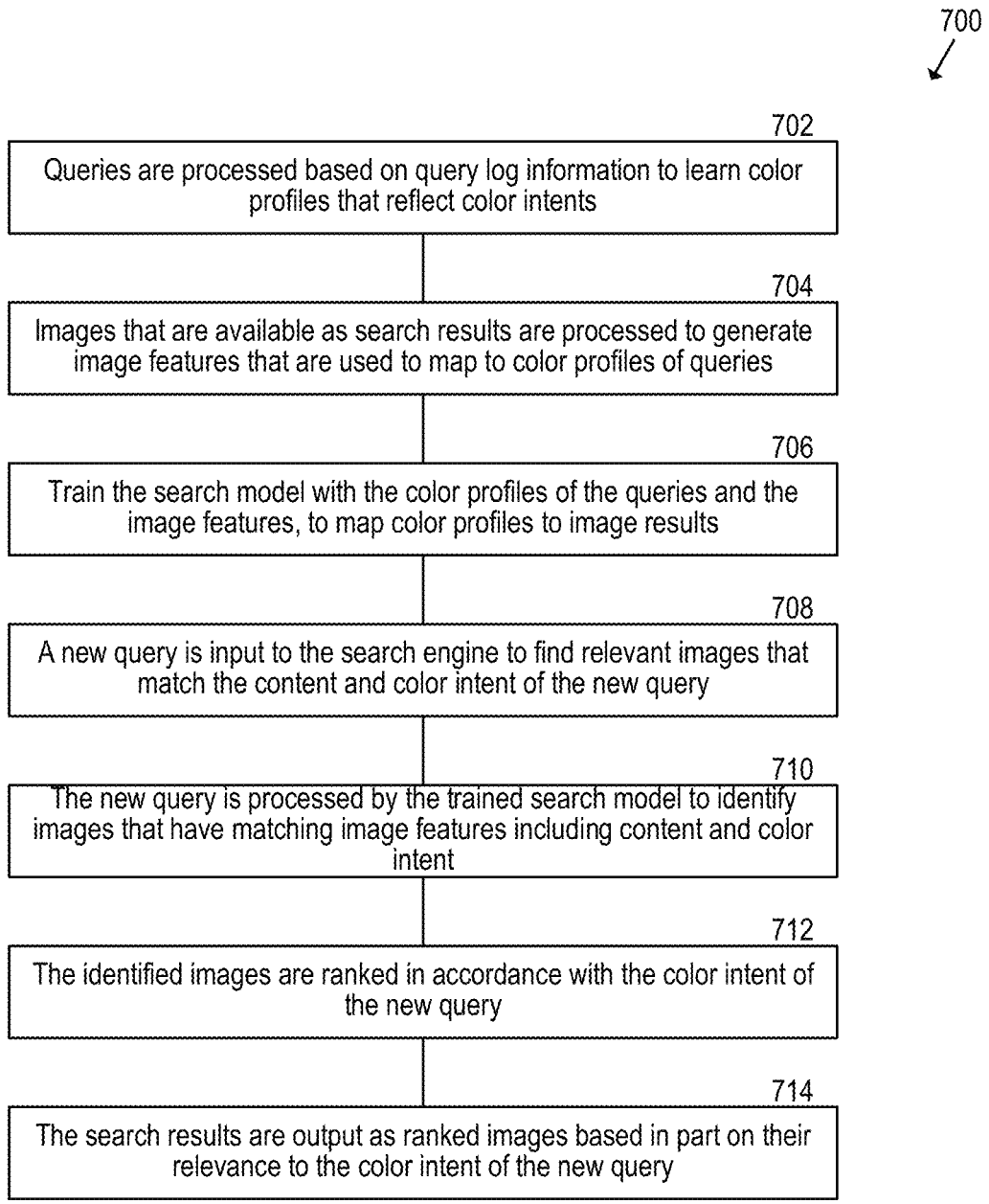
FIG. 7 is a flowchart that illustrates an overview of a search process for finding images that are relevant to a color intent of a query.

FIG. 7 is a flowchart that illustrates an overview of a search process for retrieving candidate images that are relevant to a color intent of a query. A search system can build a search model that is trained on a dataset that includes the query log of the search engine. The query log can include features of textual queries (e.g., search terms, strings), image search results and their rank orders, and click-through behavior including user interaction features with the candidate images.

In step 702, the queries are processed to identify or determine color profiles that are indicative of the color intents of queries. An example of a process to identify the color profile of a query is described with respect to FIGS. 3 and 6. For example, a query log of the search engine including user interaction features associated with candidate images are used to identify color profiles of queries. That is, query features can be mapped to color features of candidate images.

In step 704, the candidate images of a database that are available as search results are processed to generate image features that are used to map to color profiles of the queries. The candidate images can be processed based on their content and metadata (e.g., caption, tags). An example of the process to generate image features is described with respect to FIG. 6.

In step 706, the search engine is trained with the query log and images features to learn a mapping between color profiles of queries and candidate image results. For example, the search engine can train the search model with the dataset including the query log and the image features to learn to map the queries to images such that search results are influences by the color intent of the queries. As a result, the search engine is enabled to factor in the color intent of queries to search for more relevant candidate images.

In step 708, the trained search engine receives a new query as input to search for relevant images. For example, a user can input a textual query in a text field box of a portal displayed on a user interface. The user interface can be displayed on a display of a computing device such as a personal computer, tablet, or handheld mobile device (e.g., smartphone). The new query was not necessarily included in the training dataset. The new query is processed with the query color encoder to generate a color profile that indicates a color intent of the query as described earlier.

In step 710, the color profile of the new query is processed by the trained search model of the search engine to identify candidate images that at least partially match image features including content and color intent (e.g., an image color profile). A set of candidate images that satisfy the content and color intent of the new query is therefore identified.

In step 712, the identified set of relevant images is processed according to the ranker process described with respect to FIG. 6 to determine a relevance measure (e.g., relevance score). The relevance may be represented as a distance between the color profile of the new query and the image features of the candidate images or between candidate images. Hence, the distance between the color intent of the new query and the candidate images or between the candidate images is proportional to their relevancy where shorter distances reflect a greater measure of relevance than longer distances. As such, the set of candidate images can be ordered based in part on the similarity of the candidate In step 714, an output of image data indicative of the ordered set of candidate images is returned in response to the query. For example, the ranked order of the set of candidate images can be returned in response to the query. Hence, the search results include one or more images that satisfy the terms of the query and the ranking of the images reflects the relative relevancy of each candidate image to the color intent of the query. For example, more relevant images can be positioned at the top of a list of relevant images while less relevant images are positioned at the bottom of the list.

Search System

Figure 8:
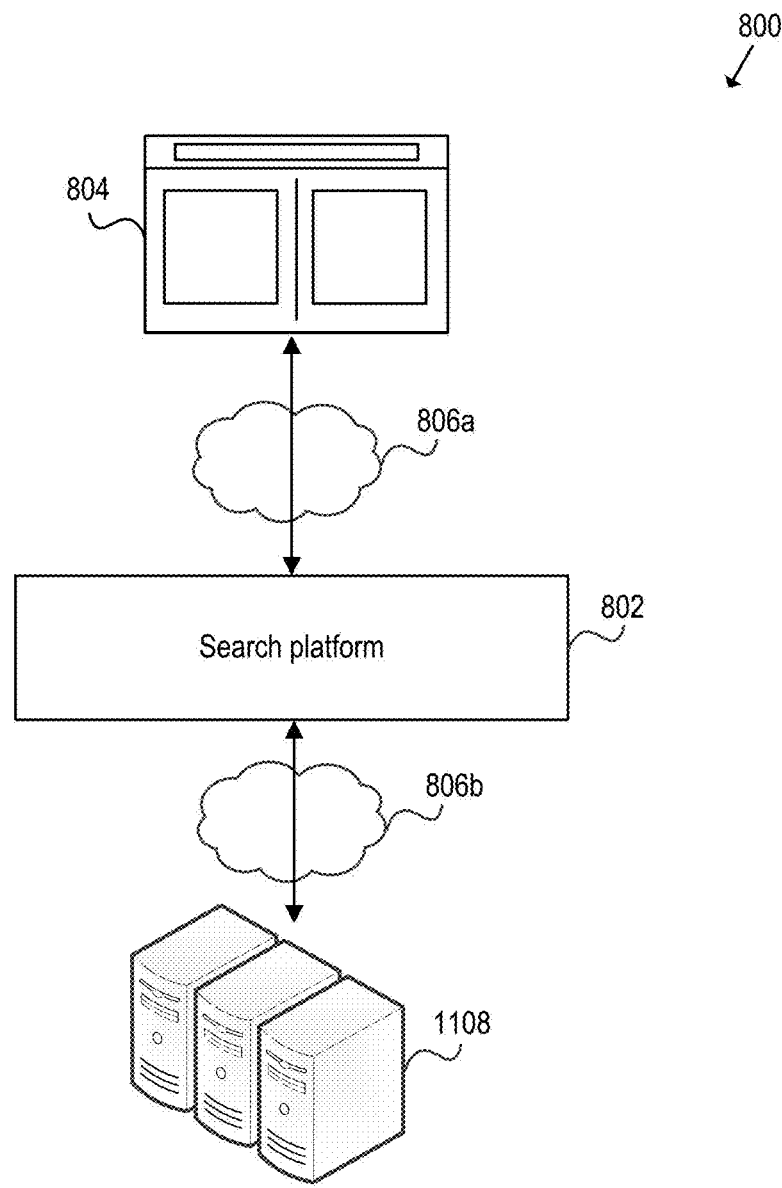
FIG. 8 illustrates a network environment that includes a search engine to perform a search for an image by considering color intent.

FIG. 8 illustrates a network environment 800 that includes a search platform 802 (e.g., search engine) to perform a search for an image by considering color intent. Individuals can interface with the search platform 802 via an interface 804. The search platform 802 can be embodied in any computing device. The search platform 802 may be responsible for performing the process for learning color profiles of queries. A user can access the search platform 802 and then submit, via an interface of the search platform 802, a query for images from a database.

In some embodiments, the search platform 802 may reside in a network environment 800. Thus, the search platform 802 may be connected to one or more networks 806a-b. The network(s) 806a-b can include personal area networks (PANs), local area networks (LANs), wide area networks (WANs), metropolitan area networks (MANs), cellular networks, the Internet, etc. Additionally or alternatively, the editing platform 1102 can be communicatively coupled to computing device(s) over a short-range communication protocol, such as Bluetooth® or near-field communication (NFC).

The interface 804 is preferably accessible via a web browser, desktop application, mobile application, and/or over-the-top (OTT) application. Accordingly, the interface 804 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

Some features of the search platform 802 can be hosted locally. That is, the search platform 802 may reside on the computing device used to access the interface 804. For example, the search platform 802 may be embodied as a desktop application executing on a personal computer. Other embodiments of the search platform 802 are executed by a cloud computing service operated by Amazon Web Services® (AWS), Google Cloud Platform™, Microsoft Azure®, or a similar technology. In such embodiments, the search platform 802 may reside on a host computer server that is communicatively coupled to one or more content computer servers 808. The content computer server(s) 808 can include different types of data (e.g., images, query logs), user information (e.g., profiles and credentials), and other assets. Such information could also be stored on the host computer server.

Certain embodiments are described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may cause necessary assets (e.g., graphics, matching algorithms, and processing operations) to be downloaded at a single point in time or on a periodic basis (e.g., weekly, daily, or hourly).

Computing System

Figure 9:
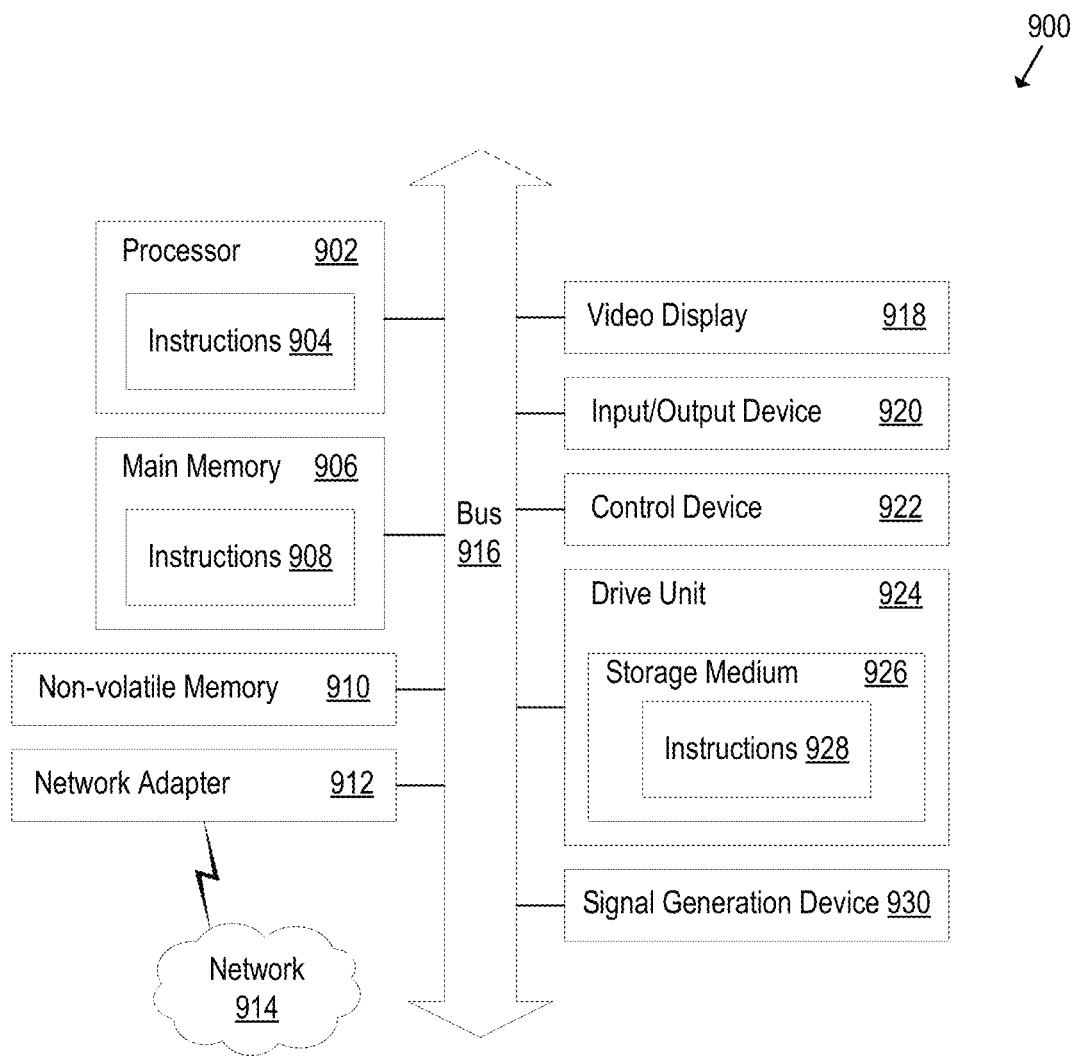
FIG. 9 is a block diagram illustrating an example of a computing system in which at least some operations described herein can be implemented.

FIG. 9 is a block diagram illustrating an example of a computing system 900 in which at least some operations described herein can be implemented. For example, some components of the computing system 900 may be hosted on a computing device that includes an editing platform (e.g., the search platform 802 of FIG. 8).

The computing system 900 may include one or more central processing units (also referred to as "processors") 902, main memory 906, non-volatile memory 910, network adapter 912 (e.g., network interface), video display 918, input/output devices 920, control device 922 (e.g., keyboard and pointing devices), drive unit 924 including a non-transitory computer-readable storage medium 926, and signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1194 bus (also referred to as "Firewire").

The computing system 900 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the computing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computing device. When read and executed by the one or more processors 902, the instruction(s) cause the computing system 900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 912 enables the computing system 900 to mediate data in a network 914 with an entity that is external to the computing system 900 through any communication protocol supported by the computing system 900 and the external entity. The network adapter 912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:

1. A computer-implemented method comprising:
   receiving a query that contains text including one or more terms that indicate a desired content for an image;
   generating query features based on the one or more terms of the query;
   generating a color profile comprising a color histogram indicative of a color intent from the one or more terms of the query by utilizing a machine learning model to process the query features of the one or more terms according to learned color profiles of a plurality of previous queries;
   identifying a set of candidate images associated with respective candidate color profiles, each of the set of candidate images at least partially matching the desired content and the color intent from the one or more terms of the query;
   ordering the set of candidate images based in part on a similarity of the candidate color profile for each candidate image with the color profile of the query; and
   outputting image data indicative of the ordered set of candidate images.

2. The computer-implemented method of claim 1, wherein receiving the query comprises utilizing a search engine that implements the machine learning model, to output the image data indicative of the ordered set of candidate images by:
   causing output of the ordered set of candidate images on a display device of a computing device as search results for the query, the query being submitted to the search engine through the computing device.

3. The computer-implemented method of claim 1, wherein generating the query features based on the one or more terms of the query comprises:
   generating word embeddings for the one or more terms of the query, wherein the query features are based on the word embeddings.

4. The computer-implemented method of claim 3, wherein utilizing the machine learning model to process the query features comprises:
   processing the word embeddings with a bidirectional long short-term memory layer.

5. The computer-implemented method of claim 3, wherein the query features are generated by concatenating the word embeddings for the one or more terms of the query.

6. The computer-implemented method of claim 1, wherein the query is further processed by a normalized exponential function to generate the color profile.

7. The computer-implemented method of claim 1, wherein generating the color profile comprises generating the color histogram including a probability distribution over a plurality of color bins.

8. The computer-implemented method of claim 1, wherein the machine learning model includes at least one fully connected layer and a rectifier linear unit.

9. The computer-implemented method of claim 1, wherein ordering the set of candidate images comprises:
   ranking the set of candidate images based on an amount of content of each candidate image that matches the desired content, the ranking being weighted by the similarity of the candidate color profile for each candidate image with the color profile of the query.

10. The computer-implemented method of claim 1, wherein generating the color profile comprises utilizing the machine learning model to process the query features based on a plurality of queries, sets of candidate images, and user interaction features associated with the sets of candidate images.

11. The computer-implemented method of claim 10, wherein utilizing the machine learning model to process the query features comprises utilizing click through data for the plurality of queries, the click through data comprising the user interaction features indicating a user selection or non-selection of one or more candidate images.

12. The computer-implemented method of claim 10, wherein utilizing the machine learning model to process the query features comprises utilizing click through data for the plurality of queries, the click through data comprising the user interaction features indicating user inputs causing scrolling through a particular set of candidate images.

13. The computer-implemented method of claim 10, wherein utilizing the machine learning model to process the query features comprises utilizing click through data for the plurality of queries, the click through data comprising the user interaction features indicating a sequence of candidate images selected by a particular user.

14. The computer-implemented method of claim 10, wherein utilizing the machine learning model to process the query features comprises utilizing click through data for the plurality of queries, the click through data comprising the user interaction features including a first type of interaction feature having a first weight of a first magnitude and a second type of interaction feature having a second weight of a second magnitude less than the first magnitude, and wherein the machine learning model is differentially biased based on the first and second magnitudes of the first and second types of interaction features.

15. The computer-implemented method of claim 14, wherein the first type of interaction feature is a click action on a candidate image and the second type of interaction feature is a hovering action over a candidate image.

16. The computer-implemented method of claim 1, wherein generating the color profile comprises utilizing the machine learning model to process the query features based on user interaction features of a particular user with sets of candidate images for respective queries.

17. The computer-implemented method of claim 1 further comprising:
   identifying a particular image retrieved by a search engine as a search result for a given query, the particular image being associated with at least one of a caption or a tag;
   extracting one or more word embeddings from the caption or the tag;
   processing the particular image with a residual network and histogram to generate one or more image embeddings;
   generating image features by concatenating the one or more word embeddings with the one or more image embeddings;
   generating query-image features based on the color profile, the query features, and the image features; and
   processing the query-image features with a machine learning process to generate a relevance measure for the particular image.

18. The computer-implemented method of claim 17, the machine learning process comprises:
   a series of machine learning layers including a plurality of fully connected layers and a plurality of rectifier units.

19. A computing system comprising:
   a processor; and
   memory containing instructions that, when executed by the processor, cause the computing system to:
   receive a query that contains text including one or more terms that indicate a desired content for an image, the query being received by a search engine;
   generate query features based on the one or more terms of the query;
   determine, by processing the query features of the one or more terms utilizing a machine learning model, a color histogram indicative of a color intent from the one or more terms of the query to determine a predicted color profile according to learned color profiles of a plurality of query features of a plurality of queries having associated color histograms color, the plurality of queries previously processed by the search engine;
   identify a set of candidate images that are each associated with respective candidate color histograms, each of the set of candidate images at least partially matching the desired content and the color histogram of the query;
   ranking the set of candidate images based in part on a similarity of the candidate color histogram of each candidate image with the color histogram of the query; and
   causing, on a display device, output of results that satisfy the query, the results including the ranked set of candidate images.

20. A non-transitory computer-readable medium with instructions stored thereon that, when executed by a processor, cause the processor to perform operations comprising:
   generating query features based on text including terms of a query;
   generating a color profile comprising a color histogram indicative of a color intent from the terms of the query by utilizing a machine learning model to process the query features of the terms according to learned color profiles of a plurality of previous queries;
   identifying a set of candidate images comprising respective candidate color profiles that at least partially match the color intent from the terms of the query, the set of candidate images being identified from among a plurality of images available to a search engine;
   ordering the set of candidate images based on a similarity of the candidate color profile for each candidate image with the color profile of the query; and
   providing image data indicative of the ordered set of candidate image.

* * * * *